(12) United States Patent
Li et al.

(10) Patent No.: US 10,958,972 B2
(45) Date of Patent: Mar. 23, 2021

(54) CHANNEL CHANGE METHOD AND APPARATUS

(71) Applicant: HUAWEI TECHNOLOGIES CO., LTD., Guangdong (CN)

(72) Inventors: Zimian Li, Hangzhou (CN); Qiulin Chen, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 223 days.

(21) Appl. No.: 16/270,492

(22) Filed: Feb. 7, 2019

(65) Prior Publication Data

US 2019/0174177 A1 Jun. 6, 2019

Related U.S. Application Data

(63) Continuation of application No. PCT/CN2017/096236, filed on Aug. 7, 2017.

(30) Foreign Application Priority Data

Aug. 9, 2016 (CN) .......................... 201610648234.6

(51) Int. Cl.
*H04N 21/438* (2011.01)
*H04N 21/845* (2011.01)
(Continued)

(52) U.S. Cl.
CPC ..... *H04N 21/4384* (2013.01); *H04L 29/0651* (2013.01); *H04L 29/06448* (2013.01);
(Continued)

(58) Field of Classification Search
CPC ....... H04L 29/06176; H04L 29/06387–06394; H04L 29/06448–0651; H04L 65/00;
(Continued)

(56) References Cited

U.S. PATENT DOCUMENTS 6,078,594 A * 6/2000 Anderson .......... H04N 21/4384
348/462
7,523,482 B2 * 4/2009 Barrett ............. H04N 21/23406
725/118
(Continued)

FOREIGN PATENT DOCUMENTS

CN 101202907 A 6/2008
CN 101321275 A 12/2008
(Continued)

OTHER PUBLICATIONS

Extended European Search Report issued in European application No. 17838677.7, dated Jun. 5, 2019, 8 pages.
(Continued)

*Primary Examiner* — Brendan Y Higa
(74) *Attorney, Agent, or Firm* — Fish & Richardson P.C.

(57) ABSTRACT

Embodiments of the present disclosure disclose a channel change method and a related apparatus. The channel change method includes: receiving a live stream of a first channel, where the live stream of the first channel includes N media file sets; separately encoding the live stream of the first channel in different coding manners, to generate both a main stream and a sub stream; and generating a playlist of the first channel according to channel information of the first channel, coding information of the main stream, and coding information of the sub stream. The playlist instructs the client to perform channel change according to the main stream and the sub stream in response to that a client sends a channel change instruction.

22 Claims, 4 Drawing Sheets

(51) Int. Cl.
| | |
|---|---|
| *H04N 21/44* | (2011.01) |
| *H04N 21/637* | (2011.01) |
| *H04L 29/06* | (2006.01) |
| *H04N 19/177* | (2014.01) |
| *H04N 21/2343* | (2011.01) |
| *H04N 21/262* | (2011.01) |
| *H04N 21/61* | (2011.01) |

(52) U.S. Cl.
CPC ...... *H04L 65/4069* (2013.01); *H04L 65/4076* (2013.01); *H04L 65/4084* (2013.01); *H04L 65/607* (2013.01); *H04L 65/608* (2013.01); *H04N 19/177* (2014.11); *H04N 21/23439* (2013.01); *H04N 21/26258* (2013.01); *H04N 21/438* (2013.01); *H04N 21/44016* (2013.01); *H04N 21/6125* (2013.01); *H04N 21/6175* (2013.01); *H04N 21/637* (2013.01); *H04N 21/8455* (2013.01); *H04N 21/8456* (2013.01)

(58) Field of Classification Search
CPC ......... H04L 65/40–4007; H04L 65/4069–608; H04L 65/4076–608; H04L 67/00; H04N 19/00; H04N 19/169; H04N 19/177; H04N 21/00; H04N 21/2343; H04N 21/23439; H04N 21/26258; H04N 21/26283; H04N 21/438–4384; H04N 21/462–4622; H04N 21/6125; H04N 21/6175; H04N 21/63; H04N 21/637; H04N 21/64322; H04N 21/845–8456
See application file for complete search history.

(56) References Cited

U.S. PATENT DOCUMENTS

| | | | | |
|---|---|---|---|---|
| 7,929,059 B2* | 4/2011 | Watson | H04N 21/4384 348/725 |
| 8,468,573 B2* | 6/2013 | Song | H04N 21/4384 725/114 |
| 8,700,792 B2* | 4/2014 | Hughes | H04N 21/6408 709/231 |
| 8,925,030 B2* | 12/2014 | Farkash | H04N 21/23439 725/134 |
| 2004/0034863 A1* | 2/2004 | Barrett | H04N 21/2543 725/38 |
| 2004/0093618 A1* | 5/2004 | Baldwin | H04N 21/2387 725/101 |
| 2004/0160974 A1* | 8/2004 | Read | H04N 21/482 370/431 |
| 2005/0081244 A1* | 4/2005 | Barrett | H04N 21/6408 725/97 |
| 2005/0174483 A1* | 8/2005 | Ruckriem | H04N 21/4316 348/387.1 |
| 2006/0075428 A1* | 4/2006 | Farmer | H04N 21/4384 725/38 |
| 2006/0123445 A1* | 6/2006 | Sullivan | H04N 19/427 19/427 |
| 2007/0044130 A1* | 2/2007 | Skoog | H04N 21/4383 725/110 |
| 2007/0098079 A1* | 5/2007 | Boyce | H04N 5/4401 375/240.25 |
| 2007/0130596 A1* | 6/2007 | Wirick | H04N 21/2381 725/90 |
| 2007/0171942 A1* | 7/2007 | Quinard | H04N 7/17309 370/498 |
| 2007/0174880 A1* | 7/2007 | Fite | H04N 21/44016 725/87 |
| 2007/0250635 A1* | 10/2007 | Hamilton | H04L 65/80 709/231 |
| 2007/0266398 A1* | 11/2007 | Vandaele | H04N 21/26616 725/38 |
| 2007/0280298 A1* | 12/2007 | Hearn | H04N 21/6581 370/498 |
| 2008/0022007 A1* | 1/2008 | Hostyn | H04N 21/4383 709/231 |
| 2009/0282158 A1* | 11/2009 | Courtemanche | H04N 21/643 709/231 |
| 2009/0322962 A1* | 12/2009 | Weeks | H04N 21/23436 348/726 |
| 2010/0138886 A1 | 6/2010 | Henry et al. | |
| 2011/0161517 A1 | 6/2011 | Ferguson | |
| 2012/0163476 A1* | 6/2012 | Gautier | H04N 21/242 375/240.26 |
| 2012/0173753 A1* | 7/2012 | Moorthy | H04N 21/4345 709/231 |
| 2013/0054804 A1* | 2/2013 | Jana | H04N 21/6125 709/226 |
| 2013/0091251 A1 | 4/2013 | Walker et al. | |
| 2014/0053208 A1* | 2/2014 | Sirpal | G06F 3/04883 725/52 |
| 2014/0280781 A1* | 9/2014 | Gregotski | H04L 67/06 709/219 |
| 2015/0033268 A1* | 1/2015 | Alford | H04N 21/64322 725/54 |
| 2016/0127728 A1 | 5/2016 | Tanizawa et al. | |

FOREIGN PATENT DOCUMENTS

| | | |
|---|---|---|
| CN | 101552920 A | 10/2009 |
| CN | 101682753 A | 3/2010 |
| CN | 101686391 A | 3/2010 |
| CN | 101909063 A | 12/2010 |
| CN | 102187667 A | 9/2011 |
| CN | 103716681 A | 4/2014 |
| CN | 103931204 A | 7/2014 |
| CN | 104486666 A | 4/2015 |
| CN | 105357567 A | 2/2016 |
| CN | 106303682 A | 1/2017 |
| WO | 2010114450 A1 | 10/2010 |

OTHER PUBLICATIONS

Systems subgroup, "Technologies under Consideration for ISO/IEC 23009-1 Dynamic Adaptive Streaming over HTTP", ISO/IEC JTC1/SC291WG11 No. N 12682, May 8, 2012, 18 pages.
B. VerSteeg et al, Unicast-Based Rapid Acquisition of Multicast RTP Sessions draft-ieff-avt-rapid-acquisition-for-rtp-00. May 12, 2009, 37 pages.
ITU-T H.264, Series H: Audiovisual and Multimedia Systems Infrastructure of audiovisual services—Coding of moving video Advanced video coding for generic audiovisual services. Feb. 2016, 807 pages.
ITU-T H.265, Series H: Audiovisual and Multimedia Systems Infrastructure of audiovisual services—Coding of moving video High efficiency video coding. Apr. 2015, 634 pages.
Chinese Office Action issued in Chinese Application No. 201610648234 dated Sep. 20, 2018, 6 pages.
Chinese Search Report issued in Chinese Application No. 2016106482346 dated Sep. 12, 2018, 2 pages.
International Search Report and Written Opinion issued in International Application No. PCT/CN2017/096236 dated Nov. 6, 2017, 20 pages.

* cited by examiner

100

CHANNEL CHANGE METHOD AND APPARATUS

CROSS-REFERENCE TO RELATED APPLICATIONS

This application is a continuation of International Application No. PCT/CN2017/096236, filed on Aug. 7, 2017, which claims priority to Chinese Patent Application No. 201610648234.6, filed on Aug. 9, 2016. The disclosures of the aforementioned applications are hereby incorporated by reference in their entireties.

TECHNICAL FIELD

Embodiments of the present invention relate to the video field, and more specifically, to a channel change method and apparatus.

BACKGROUND

OTT is short for "Over The Top", meaning that various application services are provided for a user by means of the Internet. Such applications are different from communications services currently provided by an operator. These applications only utilize a network of the operator, while services are provided by a third party other than the operator. Currently, typical OTT services include an Internet television service (OTT video service), Apple's APP Store, and the like.

The term "Over The Top" is derived from physical exercises such as basketball and means "overhead pass", meaning that basketball players pass a basketball back and forth over their heads so that the basketball reaches a destination. An Internet enterprise develops services of the enterprise by using a broadband network of a telecom operator, for example, Google, Apple, Skype, or Netflix outside China, or QQ in China. For example, Netflix network videos and applications in various mobile application stores are all OTT. Many OTT service providers service and charge users directly, so that an operator becomes a simple "transmission pipeline", and cannot touch huge values of transmission in the pipeline.

In recent years, OTT video services are in a trend of fast development. Not only conventional video websites have marched into the OTT field, but conventional telecom operators have also started to set foot in OTT services to take their share. For example, a 4K video service that was launched by Deutsche Telekom in 2016 is in a mode of IPTV+OTT. Like conventional IPTV services, main scenarios of OTT services also include live broadcast and on-demand broadcast. A difference is that conventional IPTV services mostly use the RTP/RTSP protocol, mostly with a bottom layer based on the UDP protocol of unreliable transmission, but OTT live broadcast and on-demand broadcast usually use a streaming media protocol such as HLS/DASH/MSS with a bottom layer based on the TCP protocol of reliable transmission. In addition, conventional IPTV services of a telecom operator include on-demand broadcast and live broadcast, and the live broadcast usually assumes an RTP multicast manner. This manner has a relatively high requirement on a network, usually requiring a dedicated network for a special purpose. If the telecom operator intends to provide, in one network, both common data services (such as broadband Internet access) and video services (such as live broadcast and on-demand broadcast, OTT services are more appropriate than conventional IPTV services because OTT services mostly assume a unicast manner. Therefore, in comparison with conventional IPTV services, OTT services have an apparent advantage.

However, conventional IPTV live services have developed for many years, a relatively stable FCC solution of CBR multicast+variable speed unicast+multicast switching has taken form, and a corresponding IETF standard (draft-ietf-avt-rapid-acquisition-for-rtp) has also taken form. This can limit a channel change delay in IPTV live broadcast to approximately 1 second, and a depth of a resulting time deviation is also controllable. For a live service in an OTT scenario, because a bottom-layer streaming protocol and transmission manner have changed, the FCC solution of IPTV is no longer applicable, and the mainstream protocol HLS/DASH/MSS used for OTT also lacks an FCC-related recommendation or standard. Therefore, for a live service in an OTT scenario, a channel change delay is relatively large, and a time deviation resulting from channel change is also relatively large.

SUMMARY

Embodiments of the present invention provide a channel change method and apparatus, applied to an OTT video service, so that a delay in a channel change process can be reduced, and an efficient channel change function is provided for a live service in an OTT scenario.

According to a first aspect, an embodiment of the present invention provides a channel change method, applied to an OTT (Over The Top) video service, where the method includes:

receiving a live stream of a first channel, where the live stream of the first channel includes N media file sets, a first media file set includes n media files, N is an integer greater than or equal to 1, n is an integer greater than or equal to 2, and the first media file set is any one of the N media file sets;

separately encoding the live stream of the first channel in different coding manners, to generate both a main stream and a sub stream, where the main stream includes the N media file sets and main stream coding information, the sub stream includes the N media file sets and sub stream coding information, the main stream is used for live broadcast, and the sub stream is used for channel change; and generating a playlist of the first channel according to channel information of the first channel, the coding information of the main stream, and the coding information of the sub stream, where the playlist is used to: when a client sends a channel change instruction, instruct the client to perform channel change according to the main stream and the sub stream.

The channel change method in the first aspect is executed by a server. The server separately encodes the live stream of the first channel in different coding manners to generate the main stream and the sub stream. The main stream is used for live broadcast, and the sub stream is specially used for channel change. Therefore, when channel change occurs, the special sub stream is used to guide the channel change, so that channel change efficiency is improved.

In a possible implementation of the first aspect, the separately encoding the live stream of the first channel in different coding manners, to generate both a main stream and a sub stream includes:

encoding the live stream of the first channel by using a video coding standard, to generate the main stream; and encoding the live stream of the first channel by using the video coding standard, and inserting an auxiliary frame into the live stream of the first channel, to generate the sub stream.

In this implementation, the auxiliary frame is inserted into the live stream of the first channel to generate the sub stream. In this way, more access points are provided for stream access during channel change. Therefore, a decoding-refreshed image frame can be obtained and played in real time, so that the channel change may have a shorter change delay.

Optionally, in this possible implementation, the auxiliary frame includes a change I frame that is independently decodable and a change P frame that is decoded depending on the change I frame, and the inserting an auxiliary frame into the live stream of the first channel, to generate the sub stream specifically includes:

sequentially inserting the change I frame and the change P frame into each media file in the N media file sets included in the live stream of the first channel, where the change I frame and the change P frame are used to provide the sub stream with more stream access points than the main stream.

The auxiliary frame includes the change I frame that is independently decodable and the change P frame that is decoded depending on the change I frame, and the change I frame and the change P frame are sequentially inserted into the live stream to generate the sub stream. In this way, these change I frames and change P frames may provide more stream access points than the main stream for channel change, so that a terminal may obtain and play a decoding-refreshed image frame in real time according to these change I frames and change P frames. Therefore, the channel change may have a shorter change delay.

It should be noted that, the sequential inserting herein means inserting the change I frame and the change P frame at intervals, and in this insertion manner, the frames may be evenly inserted, or may not be evenly inserted, but be inserted according to another rule.

In a possible implementation of the first aspect, each of the n media files includes one or more GOPs (group of picture, group of pictures), and each GOP includes two or more image frames; and the sequentially inserting the change I frame and the change P frame specifically includes: sequentially inserting the change I frame and the change P frame according to preset density, where the preset density is specified according to a length of the GOP, and the length of the GOP is represented by a quantity of image frames included in the GOP.

In another possible implementation of the first aspect, the playlist of the first channel includes the coding information of the main stream, the coding information of the sub stream, an ID of the first channel, and a download link of a media file included in the N media file sets.

According to a second aspect, an embodiment of the present invention provides a channel change method, applied to an OTT (Over The Top) video service, where the method includes:

sending a channel change instruction, and stopping obtaining a media file of a currently played channel;

requesting a playlist of a first channel from a server, where the first channel is a new channel that is a change target and that is indicated by the channel change instruction; and receiving the playlist of the first channel, and performing channel change according to the playlist of the first channel, a main stream, and a sub stream, where the main stream and the sub stream are obtained by separately encoding a live stream of the first channel in different coding manners.

The channel change method in the second aspect is executed by a terminal. The terminal receives the playlist of the first channel, and performs channel change according to the playlist of the first channel, the main stream, and the sub stream. The main stream and the sub stream are obtained by separately encoding the live stream of the first channel in different coding manners, the main stream is used for live broadcast, and the sub stream is specially used for channel change. Therefore, when channel change occurs, the special sub stream is used to guide the channel change, so that channel change efficiency is improved.

In a possible implementation of the second aspect, the playlist of the first channel includes coding information of the main stream, coding information of the sub stream, an ID of the first channel, and a download link of a media file in N media file sets included in the live stream of the first channel, and N is an integer greater than or equal to 1.

In another possible implementation of the second aspect, the performing channel change according to the playlist of the first channel, a main stream, and a sub stream includes:

selecting, according to the playlist of the first channel, stream access points in the sub stream that are closest to a receiving moment of the channel change instruction; downloading, according to the download link that is in the playlist of the first channel and that is of the media file included in the N media file sets, an image frame that is not played in a current media file, and playing the image frame, where the current media file is a media file that is in the sub stream and in which image frames that are in a one-to-one correspondence with the closest stream access points are located; and when playing of all image frames in the current media file is completed, switching to play a next media file that is in the main stream and that is of a media file in a one-to-one correspondence with the current media file.

In this implementation, the sub stream is provided for channel change, and channel change does not depend only on the main stream. It may be learned that, a media file in the main stream has only one stream access point for access, and decoding dependency of the main stream is relatively complex. The sub stream provided in this implementation provides another possibility for channel change, so that when channel change occurs, the stream access point that is in the sub stream and that is closest to the receiving moment of the channel change instruction may be selected according to the playlist of the first channel, for access. Therefore, a change delay is reduced, and a shorter change-caused time deviation is generated.

According to the previous possible implementation, in another possible implementation of the second aspect, the method further includes:

after the downloading an image frame that is not played in a current media file, downloading, before playing of all the image frames in the current media file is completed, the next media file that is in the main stream and that is of the media file in a one-to-one correspondence with the current media file.

In this possible implementation, before playing of the sub stream is completed, the next media file that is in the main stream and that is of the media file in a one-to-one correspondence with the current media file starts to be downloaded. In this way, once playing of the current media file is completed, the next media file in the main stream may be directly accessed and start to be played. Therefore, switching between the sub stream and the main stream is seamless, and a change delay is reduced.

In still another possible implementation of the second aspect, that the main stream and the sub stream are obtained by separately encoding the live stream of the first channel in different coding manners specifically includes:

the main stream is generated by using a video coding standard to encode the live stream of the first channel; and the sub stream is generated by using the video coding standard to encode the live stream of the first channel and inserting an auxiliary frame into the live stream of the first channel.

In this implementation, the auxiliary frame is inserted into the live stream of the first channel to generate the sub stream. In this way, more access points are provided for stream access during channel change. Therefore, a decoding-refreshed image frame can be obtained and played in real time, so that the channel change may have a shorter change delay.

In yet another possible implementation of the second aspect, the auxiliary frame includes a change I frame that is independently decodable and a change P frame that is decoded depending on the change I frame, and that the auxiliary frame is inserted into the live stream of the first channel specifically includes:

sequentially inserting, according to preset density, the change I frame and the change P frame into each media file in the N media file sets included in the live stream of the first channel, where the change I frame and the change P frame are used to provide the sub stream with more stream access points than the main stream.

The auxiliary frame includes the change I frame that is independently decodable and the change P frame that is decoded depending on the change I frame, and the change I frame and the change P frame are sequentially inserted into the live stream according to the preset density, to generate the sub stream. In this way, these change I frames and change P frames may provide channel change with more stream access points than the main stream, so that the terminal may obtain and play a decoding-refreshed image frame in real time according to these change I frames and change P frames. Therefore, the channel change may have a shorter change delay.

According to a third aspect, an embodiment of the present invention provides a channel change apparatus, applied to an OTT (Over The Top) video service, where the apparatus includes:

a receiving module, configured to receive a live stream of a first channel, where the live stream of the first channel includes N media file sets, a first media file set includes n media files, N is an integer greater than or equal to 1, n is an integer greater than or equal to 2, and the first media file set is any one of the N media file sets;

an encoding module, configured to separately encode the live stream of the first channel in different coding manners, to generate both a main stream and a sub stream, where the main stream includes the N media file sets and main stream coding information, the sub stream includes the N media file sets and sub stream coding information, the main stream is used for live broadcast, and the sub stream is used for channel change; and a playlist generation module, configured to generate a playlist of the first channel according to channel information of the first channel, the coding information of the main stream, and the coding information of the sub stream, where the playlist is used to: when a client sends a channel change instruction, instruct the client to perform channel change according to the main stream and the sub stream.

The channel change apparatus in the third aspect separately encodes the live stream of the first channel in different coding manners, to generate the main stream and the sub stream, the main stream is used for live broadcast, and the sub stream is specially used for channel change. Therefore, when channel change occurs, the special sub stream is used to guide the channel change, so that channel change efficiency is improved.

In a possible implementation of the third aspect, the encoding module is specifically configured to:

encode the live stream of the first channel by using a video coding standard, to generate the main stream; and encode the live stream of the first channel by using the video coding standard, and insert an auxiliary frame into the live stream of the first channel, to generate the sub stream.

In this implementation, the auxiliary frame is inserted into the live stream of the first channel to generate the sub stream. In this way, more access points are provided for stream access during channel change. Therefore, a decoding-refreshed image frame can be obtained and played in real time, so that the channel change may have a shorter change delay.

Optionally, in this possible implementation, the auxiliary frame includes a change I frame that is independently decodable and a change P frame that is decoded depending on the change I frame, and the encoding module is specifically configured to:

sequentially insert the change I frame and the change P frame into each media file in the N media file sets included in the live stream of the first channel, where the change I frame and the change P frame are used to provide the sub stream with more stream access points than the main stream.

The auxiliary frame includes the change I frame that is independently decodable and the change P frame that is decoded depending on the change I frame, and the change I frame and the change P frame are sequentially inserted into the live stream to generate the sub stream. In this way, these change I frames and change P frames may provide channel change with more stream access points than the main stream, so that a terminal may obtain and play a decoding-refreshed image frame in real time according to these change I frames and change P frames. Therefore, the channel change may have a shorter change delay.

It should be noted that, the sequential inserting herein means inserting the change I frame and the change P frame at intervals, and in this insertion manner, the frames may be evenly inserted, or may not be evenly inserted, but be inserted according to another rule.

In a possible implementation of the third aspect, each of the n media files includes one or more GOPs (group of picture, group of pictures), and each GOP includes two or more image frames; and the encoding module is specifically configured to sequentially insert the change I frame and the change P frame according to preset density, where the preset density is specified according to a length of the GOP, and the length of the GOP is represented by a quantity of image frames included in the GOP.

In another possible implementation of the third aspect, the playlist of the first channel includes the coding information of the main stream, the coding information of the sub stream, an ID of the first channel, and a download link of a media file included in the N media file sets.

According to a fourth aspect, an embodiment of the present invention provides a channel change apparatus, applied to an OTT (Over The Top) video service, where the apparatus includes:

a sending module, configured to: send a channel change instruction, and stop obtaining a media file of a currently played channel, where the sending module is further configured to request a playlist of a first channel from a server, where the first channel is a new channel that is a change target and that is indicated by the channel change instruction;

a receiving module, configured to receive the playlist of the first channel; and a channel change module, configured to perform channel change according to the playlist of the first channel, a main stream, and a sub stream, where the main stream and the sub stream are obtained by separately encoding a live stream of the first channel in different coding manners.

The channel change apparatus in the fourth aspect receives the playlist of the first channel, and performs channel change according to the playlist of the first channel, the main stream, and the sub stream. The main stream and the sub stream are obtained by separately encoding the live stream of the first channel in different coding manners, the main stream is used for live broadcast, and the sub stream is specially used for channel change. Therefore, when channel change occurs, the special sub stream is used to guide the channel change, so that channel change efficiency is improved.

In a possible implementation of the fourth aspect, the playlist of the first channel includes coding information of the main stream, coding information of the sub stream, an ID of the first channel, and a download link of a media file in N media file sets included in the live stream of the first channel, and N is an integer greater than or equal to 1.

In another possible implementation of the fourth aspect, the channel change module is specifically configured to:

select, according to the playlist of the first channel, stream access points in the sub stream that are closest to a receiving moment of the channel change instruction; download, according to the download link that is in the playlist of the first channel and that is of the media file included in the N media file sets, an image frame that is not played in a current media file, and play the image frame, where the current media file is a media file that is in the sub stream and in which image frames that are in a one-to-one correspondence with the closest stream access points are located; and when playing of all image frames in the current media file is completed, switch to play a next media file that is in the main stream and that is of a media file in a one-to-one correspondence with the current media file.

In this implementation, the sub stream is provided for channel change, and channel change does not depend only on the main stream. It may be learned that, a media file in the main stream has only one stream access point for access, and decoding dependency of the main stream is relatively complex. The sub stream provided in this implementation provides another possibility for channel change, so that when channel change occurs, the stream access point that is in the sub stream and that is closest to the receiving moment of the channel change instruction may be selected according to the playlist of the first channel, for access. Therefore, a change delay is reduced, and a shorter change-caused time deviation is generated.

According to the previous possible implementation, in another possible implementation of the fourth aspect, the channel change module is further configured to:

after the image frame that is not played in the current media file is downloaded, download, before playing of all the image frames in the current media file is completed, the next media file that is in the main stream and that is of the media file in a one-to-one correspondence with the current media file.

In this possible implementation, before playing of the sub stream is completed, the next media file that is in the main stream and that is of the media file in a one-to-one correspondence with the current media file starts to be downloaded. In this way, once playing of the current media file is completed, the next media file in the main stream may be directly accessed and start to be played. Therefore, switching between the sub stream and the main stream is seamless, and a change delay is reduced.

In still another possible implementation of the fourth aspect, that the main stream and the sub stream are obtained by separately encoding the live stream of the first channel in different coding manners specifically includes:

the main stream is generated by using a video coding standard to encode the live stream of the first channel; and the sub stream is generated by using the video coding standard to encode the live stream of the first channel and inserting an auxiliary frame into the live stream of the first channel.

In this implementation, the auxiliary frame is inserted into the live stream of the first channel to generate the sub stream. In this way, more access points are provided for stream access during channel change. Therefore, a decoding-refreshed image frame can be obtained and played in real time, so that the channel change may have a shorter change delay.

In yet another possible implementation of the fourth aspect, the auxiliary frame includes a change I frame that is independently decodable and a change P frame that is decoded depending on the change I frame, and that the auxiliary frame is inserted into the live stream of the first channel specifically includes:

sequentially inserting, according to preset density, the change I frame and the change P frame into each media file in the N media file sets included in the live stream of the first channel, where the change I frame and the change P frame are used to provide the sub stream with more stream access points than the main stream.

The auxiliary frame includes the change I frame that is independently decodable and the change P frame that is decoded depending on the change I frame, and the change I frame and the change P frame are sequentially inserted into the live stream according to the preset density, to generate the sub stream. In this way, these change I frames and change P frames may provide channel change with more stream access points than the main stream, so that a terminal may obtain and play, a decoding-refreshed image frame in real time according to these change I frames and change P frames. Therefore, the channel change may have a shorter change delay.

According to a fifth aspect, a server supporting channel change is provided, applied to an OTT (Over The Top) video service, where the server includes a transmit port, a receive port, a bus, a processor, and a memory, the bus is configured to connect the transmit port, the receive port, the processor, and the memory, and the memory is configured to store information;

the receive port is configured to receive a live stream of a first channel, where the live stream of the first channel includes N media file sets, a first media file set includes n media files, N is an integer greater than or equal to 1, n is an integer greater than or equal to 2, and the first media file set is any one of the N media file sets;

the processor is configured to separately encode the live stream of the first channel in different coding manners, to generate both a main stream and a sub stream, where the main stream includes the N media file sets and main stream coding information, the sub stream includes the N media file sets and sub stream coding information, the main stream is used for live broadcast, and the sub stream is used for channel change;

the processor is further configured to generate a playlist of the first channel according to channel information of the first channel, the coding information of the main stream, and the coding information of the sub stream, where the playlist is used to: when a client sends a channel change instruction, instruct the client to perform channel change according to the main stream and the sub stream; and the transmit port is configured to send the playlist of the first channel.

The server supporting channel change that is provided in the fifth aspect separately encodes the live stream of the first channel in different coding manners, to generate the main stream and the sub stream, the main stream is used for live broadcast, and the sub stream is specially used for channel change. Therefore, when channel change occurs, the special sub stream is used to guide the channel change, so that channel change efficiency is improved.

According to a sixth aspect, a terminal supporting channel change is provided, applied to an OTT (Over The Top) video service, where the client includes a transmitter, a receiver, and a processor;

the transmitter is configured to: send a channel change instruction, and stop obtaining a media file of a currently played channel;

the transmitter is further configured to send a request to a server, where the request is used to request a playlist of a first channel, and the first channel is a new channel that is a change target and that is indicated by the channel change instruction;

the receiver is configured to receive the playlist of the first channel; and the processor is configured to perform channel change according to the playlist of the first channel, a main stream, and a sub stream, where the main stream and the sub stream are obtained by separately encoding a live stream of the first channel in different coding manners.

The terminal supporting channel change that is provided in the sixth aspect receives the playlist of the first channel, and performs channel change according to the playlist of the first channel, the main stream, and the sub stream. The main stream and the sub stream are obtained by separately encoding the live stream of the first channel in different coding manners, the main stream is used for live broadcast, and the sub stream is specially used for channel change. Therefore, when channel change occurs, the special sub stream is used to guide the channel change, so that channel change efficiency is improved.

BRIEF DESCRIPTION OF DRAWINGS

To describe the technical solutions in the embodiments of the present invention more clearly, the following briefly describes the accompanying drawings required for describing the embodiments of the present invention. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

Figure 1:
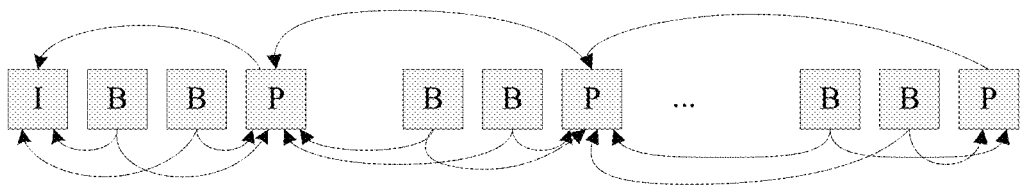
FIG. 1 is a diagram of an encoded video sequence.

Embodiments of the present invention provide a channel change method and a related apparatus, to reduce a channel change delay in an OTT video service, and reduce a time deviation resulting from channel change.

To make a person skilled in the art understand the technical solutions in the present invention better, the following clearly describes the technical solutions in the embodiments of the present invention with reference to the accompanying drawings in the embodiments of the present invention. Apparently, the described embodiments are merely some rather than all of the embodiments of the present invention. All other embodiments obtained by a person of ordinary skill in the art based on the embodiments of the present invention without creative efforts shall fall within the protection scope of the present invention.

In the specification, claims, and accompanying drawings of the present invention, the terms "first", "second", and so on are intended to distinguish between different objects but do not indicate a particular order. In addition, the terms "including", "having", or any other variants thereof, are intended to cover non-exclusive inclusion. For example, a process, a method, a system, a product, or a device that includes a series of steps or units is not limited to the listed steps or units, but optionally further includes an unlisted step or unit, or optionally further includes another inherent step or unit of the process, the method, the product, or the device.

The following first simply describes some concepts that may be involved in the embodiments of the present invention.

A basic principle of OTT (Over The Top) live broadcast is described as follows:

An S/C structure is usually used for OTT live broadcast, and includes two parts: an OTT live server and a client. Generally, each channel of OTT live broadcast includes one stream and one playlist file (playlist). The stream is usually a set of media files with lengths varying from 1 second to tens of seconds, and the media files are referred to as slices, or referred to as segments (segment). The playlist file includes coding information of the stream, program information, and a download link of each slice.

When a live channel is watched at the client, the client first needs to request a playlist of the channel from the live server, and parse the playlist according to a specific protocol specification (which is usually HLS/DASH/MSS), to obtain a download link corresponding to media data, and then downloads and plays a slice of the channel by using the HTTP/TCP protocol.

Because live content is in real time, a playlist and media data on the live server are also updated in real time. The live server maintains a time window with a fixed length, constantly generates new slices, deletes an expired slice, and periodically updates the playlist. Correspondingly, the client also needs to periodically update a playlist, so as to obtain a download link of a new slice.

An FCC (Fast Channel Change, fast channel change) technology is described as follows:

In a live service, a channel change delay and a resulting time deviation are important indicators of user experience.

The channel change delay is a time period from when a client initiates a channel change request to when the client can play the first frame of picture of a new channel. A shorter delay leads to better user experience.

The time deviation resulting from channel change is a difference, existing after channel change is performed by a client, that is between an absolute time when the first frame of picture is played and an absolute time when the picture is generated. A shorter time deviation means that a picture seen by a user is closer to a real-time picture of live broadcast.

Conventional IPTV live services have developed for many years, a relatively stable FCC solution of CBR multicast+variable speed unicast+multicast switching has taken form, and a corresponding IETF standard (draft-ietf-avt-rapid-acquisition-for-rtp) has also taken form. A channel change delay may reach approximately 1 second, and a depth of a resulting time deviation is controllable.

However, for a live service in an OTT scenario, because a bottom-layer streaming protocol and transmission manner have changed, the FCC solution of IPTV is no longer applicable, and the mainstream protocol HLS/DASH/MSS used for OTT also lacks an FCC-related recommendation or standard.

The channel change delay in OTT live broadcast includes:
1. a time for stopping play of an original channel;
2. a time for obtaining a playlist of a new channel;
3. a time for waiting for a SAP of the new channel;
4. a time for downloading a slice of the new channel;
5. a time for preparing to play the slice of the new channel.

2, 3, and 4 are main constituent parts of the delay. According to experiment data in a development process, the channel change delay may exceed 2 seconds.

The time deviation resulting from channel change in OTT live broadcast depends on a length of a slice, and a distance from a time point at which the client performs channel change to a SAP (Stream Access Point, stream access point) of the slice. In an example in which a video slice length is 10 seconds, an average value of time deviations resulting from change may reach 5 seconds.

Currently, there is a relatively large gap between channel change performance of OTT live broadcast and that of IPTV. If the channel change performance of OTT live broadcast cannot be effectively improved, there is adverse impact on popularization of OTT services.

Related knowledge of video coding and decoding is as follows:

Video data that is initially collected by a camera is raw data that is not encoded and compressed, and a data amount is extremely large. It is absolutely impossible to store or transmit over a network the raw video data. To resolve this problem, generally, the raw data is encoded according to a coding standard. Currently, mainstream coding standards include H.265, H.264, MPEG2, and the like. An encoded video sequence usually includes three types of frames: I, P, and B. Each frame is an image. An encoded video sequence is shown in FIG. 1. The I frame can be independently decoded, and has a largest volume. The P frame needs to be decoded depending on the I frame and a previous P frame, and has a relatively small volume. The B frame needs to be decoded depending on two frames: a previous frame and a following frame, and has a smallest volume. An arrow in the figure indicates decoding dependency, and decoding of a frame from which the arrow starts needs to depend on a frame to which the arrow points.

The SAP (stream access point, stream access point) mentioned in the embodiments of the present invention means that a stream can be decoded and played immediately when a user accesses the stream at this point. The SAP has to be an I frame. If the SAP is a P frame or a B frame, even though the user obtains data of the frame, because decoding of the frame needs to depend on a previous frame, the frame cannot be decoded for playing.

The following continues to discuss the technical solutions in the embodiments of the present invention.

A channel change method provided in an embodiment of the present invention is first described. The channel change method provided in the embodiment of the present invention may be executed by a server or a terminal. The terminal may be any apparatus that is capable of playing a video, for example, a television set, a notebook computer, a tablet computer, a personal computer, or a mobile phone.

Figure 2:
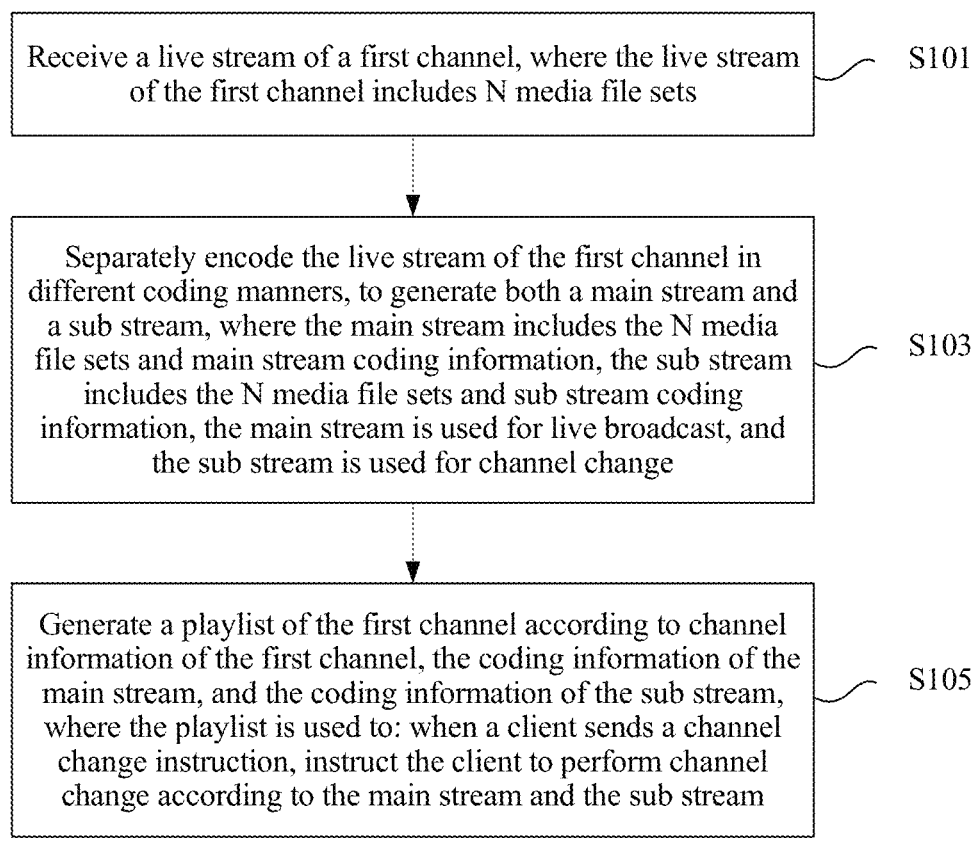
FIG. 2 is an embodiment of a channel change method according to the present invention.

FIG. 2 shows an embodiment of the channel change method provided in the present invention. A channel change method 100, applied to an OTT video service, may include the following steps.

S101. Receive a live stream of a first channel, where the live stream of the first channel includes N media file sets.

A first media file set includes n media files, N is an integer greater than or equal to 1, n is an integer greater than or equal to 2, and the first media file set is any one of the N media file sets.

S103. Separately encode the live stream of the first channel in different coding manners, to generate both a main stream and a sub stream, where the main stream includes the N media file sets and main stream coding information, the sub stream includes the N media file sets and sub stream coding information, the main stream is used for live broadcast, and the sub stream is used for channel change.

S105. Generate a playlist of the first channel according to channel information of the first channel, the coding information of the main stream, and the coding information of the sub stream, where the playlist is used to: when a client sends a channel change instruction, instruct the client to perform channel change according to the main stream and the sub stream.

The channel information of the first channel may include a channel identifier such as a channel ID.

The channel change method is executed by a server. The server separately encodes the live stream of the first channel in different coding manners, to generate the main stream and the sub stream, the main stream is used for live broadcast, and the sub stream is specially used for channel change processing. Therefore, when channel change occurs, the special sub stream is used to guide the channel change, so that channel change efficiency is improved.

It should be noted that, the foregoing steps of the method may be performed by one server, or may be separately performed by different servers. For example, a server 1 (which may be referred to as a stream generation server) performs S101 and S103, and a server 2 (which may be referred to as a live server) performs S105. To ensure that the method embodiment does not seem to be excessively scattered, no more details are described herein.

Figure 3:
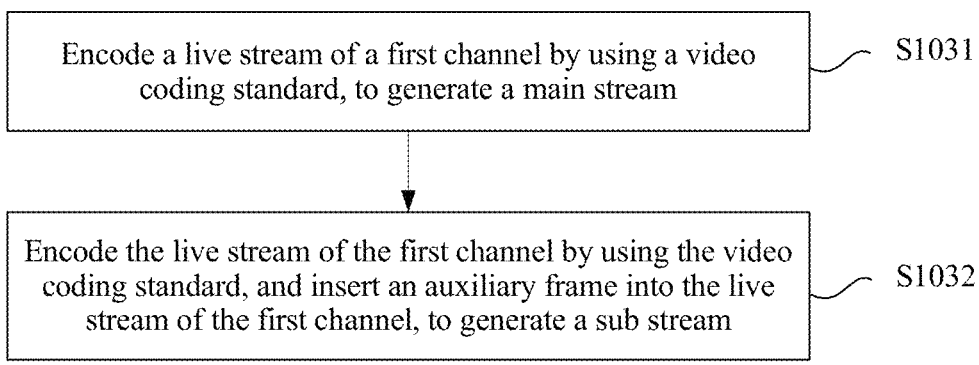
FIG. 3 is another embodiment of a channel change method according to the present invention.

As shown in FIG. 3, in another embodiment of the channel change method provided in the present invention, S103 of separately encoding the live stream of the first channel in different coding manners, to generate both a main stream and a sub stream further includes the following steps:

S1031. Encode the live stream of the first channel by using a video coding standard, to generate the main stream.

S1032. Encode the live stream of the first channel by using the video coding standard, and insert an auxiliary frame into the live stream of the first channel, to generate the sub stream.

Specifically, the auxiliary frame includes a change I frame that is independently decodable and a change P frame that is decoded depending on the change I frame. Further, in S1032, the inserting an auxiliary frame into the live stream of the first channel, to generate the sub stream specifically includes:

sequentially inserting the change I frame and the change P frame into each media file in the N media file sets included in the live stream of the first channel, where the change I frame and the change P frame are used to provide the sub stream with more stream access points than the main stream.

It should be noted that, the sequential inserting herein means inserting the change I frame and the change P frame at intervals, and in this insertion manner, the frames may be evenly inserted, or may not be evenly inserted, but be sequentially inserted according to another rule.

The video coding standard may include H.263, H.264, H.265, MPEG1, MPEG2, MPEG4, AVS, REAL8, REAL9, VC1, VP6, VP8, DIVX3, MJPEG, or the like.

To make a reader more clearly understand the "inserting an auxiliary frame into the live stream of the first channel, to generate the sub stream" in this embodiment of the present invention, a concept, that is, GOP (group of picture), is first explained herein. A GOP generally means a video sequence including multiple images, generally starts from an independently decodable I frame, and generally includes only one I frame. The following is a commonly used GOP:

I P B B P B B P B B P B B P B B

The foregoing GOP includes 16 frames in total. According to a common 30-frames-per-second video specification, the GOP may be played for approximately 0.53 seconds. In the video sequence, a volume of the I frame is very large, and is usually several times or tens of times those of the P frame and the B frame. Therefore, sometimes, to reduce a bit rate of the video sequence, a length of the GOP is increased to as great as tens of frames or even 120 frames.

In the "inserting an auxiliary frame into the live stream of the first channel, to generate the sub stream" mentioned in the foregoing embodiment, multiple SAPs are inserted into one slice, which means, generally, multiple independently decodable quasi-I frames (referred to as change I frames in this embodiment of the present invention) are inserted into one GOP as SAPs. A main purpose is to reduce decoding dependency inside the GOP, so that a user may start playing at multiple locations inside the current GOP without waiting for a start I frame of a next GOP.

In conclusion, the auxiliary frame includes the change I frame that is independently decodable and the change P frame that is decoded depending on the change I frame, and the change I frame and the change P frame are sequentially inserted into the live stream to generate the sub stream. In this way, these change I frames and change P frames may provide channel change with more stream access points than the main stream, so that a terminal may obtain and play a decoding-refreshed image frame in real time according to these change I frames and change P frames. Therefore, the channel change may have a shorter change delay, and result in a shorter changed-cause time deviation.

Based on the foregoing embodiment, in the channel change method provided in this embodiment of the present invention, further, each of the n media files includes one or more GOPs (group of picture, group of pictures), and each GOP includes two or more image frames.

The sequentially inserting the change I frame and the change P frame specifically includes: sequentially inserting the change I frame and the change P frame according to preset density, where the preset density is specified according to a length of the GOP, and the length of the GOP is represented by a quantity of image frames included in the GOP.

Based on all the foregoing embodiments, optionally, the playlist of the first channel includes the coding information of the main stream, the coding information of the sub stream, an ID of the first channel, and a download link of a media file included in the N media file sets.

The coding information may include a coding standard and audio interleaving information, and may further include caption information.

Figure 4:
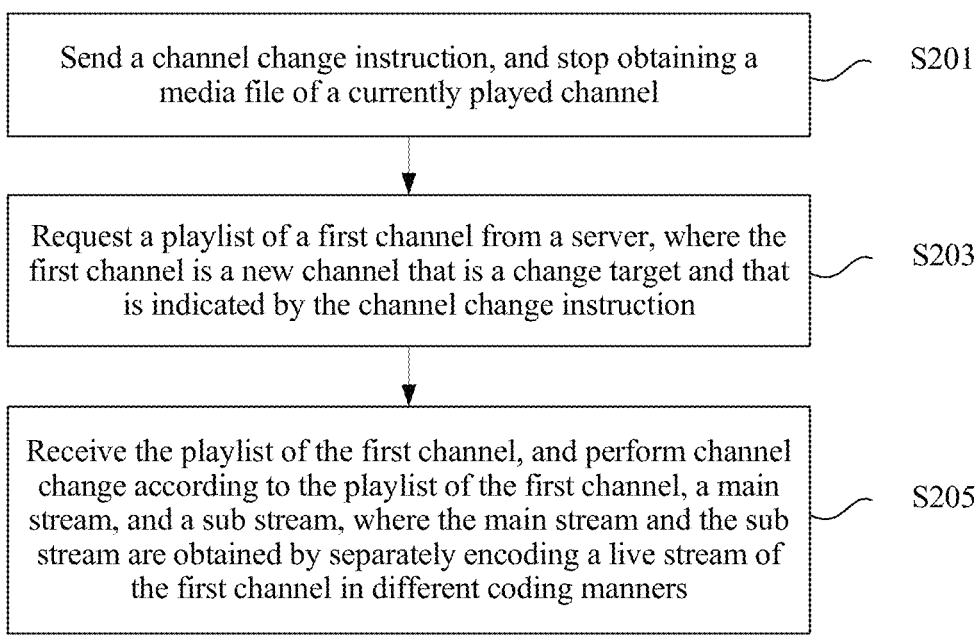
FIG. 4 is still another embodiment of a channel change method according to the present invention.

FIG. 4 shows an embodiment of the channel change method provided in the present invention. A channel change method 200, applied to an OTT video service, may include the following steps:

S201. Send a channel change instruction, and stop obtaining a media file of a currently played channel.

S203. Request a playlist of a first channel from a server, where the first channel is a new channel that is a change target and that is indicated by the channel change instruction.

S205. Receive the playlist of the first channel, and perform channel change according to the playlist of the first channel, a main stream, and a sub stream, where the main stream and the sub stream are obtained by separately encoding a live stream of the first channel in different coding manners.

Channel information of the first channel may include a channel identifier such as a channel ID.

The channel change method is executed by a terminal. The terminal receives the playlist of the first channel, and performs channel change according to the playlist of the first channel, the main stream, and the sub stream. The main stream and the sub stream are obtained by separately encoding the live stream of the first channel in different coding manners, the main stream is used for live broadcast, and the sub stream is specially used for channel change. Therefore, when channel change occurs, the special sub stream is used to guide the channel change, so that channel change efficiency is improved.

Based on the embodiment provided in FIG. 4, further, in this embodiment, the playlist of the first channel includes coding information of the main stream, coding information of the sub stream, an ID of the first channel, and a download link of a media file in N media file sets included in the live stream of the first channel, and N is an integer greater than or equal to 1.

In step S205, the performing channel change according to the playlist of the first channel, a main stream, and a sub stream specifically includes:

selecting, according to the playlist of the first channel, stream access points in the sub stream that are closest to a receiving moment of the channel change instruction; downloading, according to the download link that is in the playlist of the first channel and that is of the media file included in the N media file sets, an image frame that is not played in a current media file, and playing the image frame, where the current media file is a media file that is in the sub stream and in which image frames that are in a one-to-one correspondence with the closest stream access points are located; and when playing of all image frames in the current media file is completed, switching to play a next media file that is in the main stream and that is of a media file in a one-to-one correspondence with the current media file.

The "downloading" herein may mean that the terminal downloads the image frame to a cache area of the terminal.

The "image frame that is not played in a current media file" herein may be a media file, or may be some GOPs in a media file, or may even be some image frames of a GOP in a media file.

In this implementation, the sub stream is provided for channel change, and channel change does not depend only on the main stream. It may be learned that, a media file in the main stream has only one stream access point for access, and decoding dependency of the main stream is relatively complex. The sub stream provided in this implementation provides another possibility for channel change, so that when channel change occurs, the stream access point that is in the sub stream and that is closest to the receiving moment of the channel change instruction may be selected according to the playlist of the first channel, for access. Therefore, a change delay is reduced, and a shorter change-caused time deviation is generated.

Based on the foregoing embodiment, further, the video change method provided in this embodiment of the present invention further includes:

after the downloading an image frame that is not played in a current media file, downloading, before playing of all the image frames in the current media file is completed, the next media file that is in the main stream and that is of the media file in a one-to-one correspondence with the current media file.

In this way, the next media file that is in the main stream and that is of the media file in a one-to-one correspondence with the current media file starts to be downloaded before playing of the sub stream is completed. Once playing of the current media file is completed, the next media file in the main stream may be directly accessed and start to be played. Therefore, switching between the sub stream and the main stream is seamless, and a change delay is reduced.

Based on the foregoing embodiment, in S205 in this embodiment of the present invention, that the main stream and the sub stream are obtained by separately encoding the live stream of the first channel in different coding manners specifically includes:

the main stream is generated by using a video coding standard to encode the live stream of the first channel; and the sub stream is generated by using the video coding standard to encode the live stream of the first channel and inserting an auxiliary frame into the live stream of the first channel.

Specifically, the auxiliary frame includes a change I frame that is independently decodable and a change P frame that is decoded depending on the change I frame, and that the sub stream is generated by inserting the auxiliary frame into the live stream of the first channel specifically includes:

sequentially inserting, according to preset density, the change I frame and the change P frame into each media file in the N media file sets included in the live stream of the first channel, where the change I frame and the change P frame are used to provide the sub stream with more stream access points than the main stream.

It should be noted that, the sequential inserting herein means inserting the change I frame and the change P frame at intervals, and in this insertion manner, the frames may be evenly inserted, or may not be evenly inserted, but be sequentially inserted according to another rule.

The video coding standard may include H.263, H.264, H.265, MPEG1, MPEG2, MPEG4, AVS, REAL8, REAL9, VC1, VP6, VP8, DIVX3, MJPEG, or the like.

To make a reader more clearly understand the "inserting an auxiliary frame into the live stream of the first channel, to generate the sub stream" in this embodiment of the present invention, a concept constantly mentioned above, that is, GOP (group of picture), is first explained herein. A GOP generally means a video sequence including multiple images, generally starts from an independently decodable I frame, and generally includes only one I frame. The following is a commonly used GOP:

I P B B P B B P B B P B B P B B

The foregoing GOP includes 16 frames in total. According to a common video specification: 30 frames per second, the GOP may be played for approximately 0.53 second. In the video sequence, a volume of the I frame is very large, and is usually several times or tens of times those of the P frame and the B frame. Therefore, sometimes, to reduce a bit rate of the video sequence, a length of the GOP is increased to as great as tens of frames or even 120 frames.

In the "inserting an auxiliary frame into the live stream of the first channel, to generate the sub stream" mentioned in the foregoing embodiment, multiple SAPs are inserted into one slice, which means, generally, multiple independently decodable quasi-I frames (referred to as change I frames in this embodiment of the present invention) are inserted into one GOP as SAPs. A main purpose is to reduce decoding dependency inside the GOP, so that a user may start playing at multiple locations inside the current GOP without waiting for a start I frame of a next GOP.

In conclusion, the auxiliary frame includes the change I frame that is independently decodable and the change P frame that is decoded depending on the change I frame, and the change I frame and the change P frame are sequentially inserted into the live stream according to the preset density, to generate the sub stream. In this way, these change I frames and change P frames may provide channel change with more stream access points than the main stream, so that the terminal may obtain and play a decoding-refreshed image frame in real time according to these change I frames and change P frames. Therefore, the channel change may have a shorter change delay, and result in a shorter changed-cause time deviation.

Figure 5:
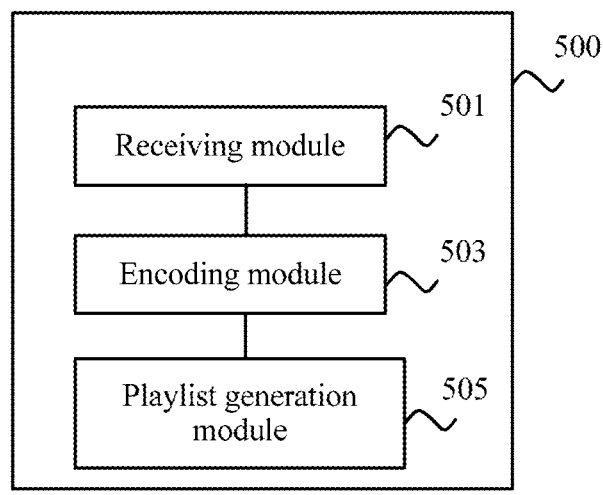
FIG. 5 is an embodiment of a channel change apparatus according to the present invention.

FIG. 5 shows an embodiment of a channel change apparatus provided in the present invention. A channel change apparatus 500, applied to an OTT video service, may include:

a receiving module 501, configured to receive a live stream of a first channel, where the live stream of the first channel includes N media file sets; and a first media file set includes n media files, N is an integer greater than or equal to 1, n is an integer greater than or equal to 2, and the first media file set is any one of the N media file sets;

an encoding module 503, configured to separately encode the live stream of the first channel in different coding manners, to generate both a main stream and a sub stream, where the main stream includes the N media file sets and main stream coding information, the sub stream includes the N media file sets and sub stream coding information, the main stream is used for live broadcast, and the sub stream is used for channel change; and a playlist generation module 505, configured to generate a playlist of the first channel according to channel information of the first channel, the coding information of the main stream, and the coding information of the sub stream, where the playlist is used to: when a client sends a channel change instruction, instruct the client to perform channel change according to the main stream and the sub stream.

The channel information of the first channel may include a channel identifier such as a channel ID.

It should be noted that, the encoding module 503 may include an encoder, configured to encode the main stream and the sub stream; or may include two encoders, configured to encode the main stream and the sub stream, respectively.

The channel change apparatus 500 separately encodes the live stream of the first channel in different coding manners, to generate the main stream and the sub stream, the main stream is used for live broadcast, and the sub stream is specially used for channel change. Therefore, when channel change occurs, the special sub stream is used to guide the channel change, so that channel change efficiency is improved.

It should be noted that, the modules in the apparatus may be in one server, or may separately exist in different servers. For example, the receiving module 501 and the encoding module 503 are in a server 1 (which may be referred to as a stream generation server), and the playlist generation module 505 is in a server 2 (which may be referred to as a live server). To ensure that the method embodiment does not seem to be excessively scattered, no more details are described herein.

In another embodiment of the channel change apparatus 500 provided in the present invention, the encoding module 503 may be specifically configured to:

encode the live stream of the first channel by using a video coding standard, to generate the main stream; and encode the live stream of the first channel by using the video coding standard, and insert an auxiliary frame into the live stream of the first channel, to generate the sub stream.

Specifically, the auxiliary frame includes a change I frame that is independently decodable and a change P frame that is decoded depending on the change I frame, and the encoding module is specifically configured to:

sequentially insert the change I frame and the change P frame into each media file in the N media file sets included in the live stream of the first channel, where the change I frame and the change P frame are used to provide the sub stream with more stream access points than the main stream.

It should be noted that, the sequential inserting herein means inserting the change I frame and the change P frame at intervals, and in this insertion manner, the frames may be evenly inserted, or may not be evenly inserted, but be sequentially inserted according to another rule.

The video coding standard may include H.263, H.264, H.265, MPEG1, MPEG2, MPEG4, AVS, REAL8, REAL9, VC1, VP6, VP8, DIVX3, MJPEG or the like.

To make a reader more clearly understand the "inserting an auxiliary frame into the live stream of the first channel, to generate the sub stream" in this embodiment of the present invention, a concept, that is, GOP (group of picture, group of pictures), is first explained herein. A GOP generally means a video sequence including multiple images, generally starts from an independently decodable I frame, and generally includes only one I frame. The following is a commonly used GOP:

I P B B P B B P B B P B B P B B

The foregoing GOP includes 16 frames in total. According to a common video specification: 30 frames per second, the GOP may be played for approximately 0.53 second. In the video sequence, a volume of the I frame is very large, and is usually several times or tens of times those of the P frame and the B frame. Therefore, sometimes, to reduce a bit rate of the video sequence, a length of the GOP is increased to as great as tens of frames or even 120 frames.

In the "inserting an auxiliary frame into the live stream of the first channel, to generate the sub stream" mentioned in the foregoing embodiment, multiple SAPs are inserted into one slice, which means, generally, multiple independently decodable quasi-I frames (referred to as change I frames in this embodiment of the present invention) are inserted into one GOP as SAPs. A main purpose is to reduce decoding dependency inside the GOP, so that a user may start playing at multiple locations inside the current GOP without waiting for a start I frame of a next GOP.

In conclusion, the auxiliary frame includes the change I frame that is independently decodable and the change P frame that is decoded depending on the change I frame, and the change I frame and the change P frame are sequentially inserted into the live stream to generate the sub stream. In this way, these change I frames and change P frames may provide channel change with more stream access points than the main stream, so that a terminal may obtain and play a decoding-refreshed image frame in real time according to these change I frames and change P frames. Therefore, the channel change may have a shorter change delay, and result in a shorter changed-cause time deviation.

Based on the foregoing embodiment, in the channel change apparatus 500 provided in this embodiment of the present invention, further, each of the n media files includes one or more GOPs (group of picture), and each GOP includes two or more image frames.

The encoding module is specifically configured to sequentially insert the change I frame and the change P frame according to preset density, where the preset density is specified according to a length of the GOP, and the length of the GOP is represented by a quantity of image frames included in the GOP.

Based on all the foregoing embodiments, optionally, the playlist of the first channel includes the coding information of the main stream, the coding information of the sub stream, an ID of the first channel, and a download link of a media file included in the N media file sets.

The coding information may include a coding standard and audio interleaving information, and may further include caption information.

Figure 6:
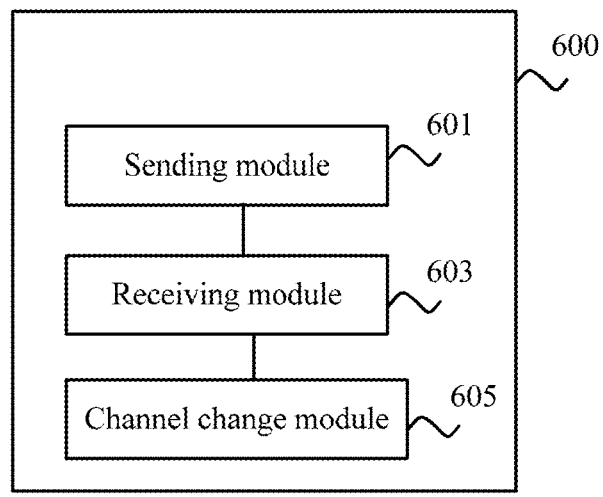
FIG. 6 is another embodiment of a channel change apparatus according to the present invention.

FIG. 6 shows an embodiment of a channel change apparatus provided in the present invention. A channel change apparatus 600, applied to an OTT video service, may include:

a sending module 601, configured to: send a channel change instruction, and stop obtaining a media file of a currently played channel, where the sending module 601 is further configured to request a playlist of a first channel from a server, where the first channel is a new channel that is a change target and that is indicated by the channel change instruction;

a receiving module 603, configured to receive the playlist of the first channel; and a channel change module 605, configured to perform channel change according to the playlist of the first channel, a main stream, and a sub stream, where the main stream and the sub stream are obtained by separately encoding a live stream of the first channel in different coding manners.

Channel information of the first channel may include a channel identifier such as a channel ID.

The channel change apparatus 600 receives the playlist of the first channel, and performs channel change according to the playlist of the first channel, the main stream, and the sub stream. The main stream and the sub stream are obtained by separately encoding the live stream of the first channel in different coding manners, the main stream is used for live broadcast, and the sub stream is specially used for channel change. Therefore, when channel change occurs, the special sub stream is used to guide the channel change, so that channel change efficiency is improved.

Based on the embodiment provided in FIG. 6, further, in this embodiment, the playlist of the first channel includes coding information of the main stream, coding information of the sub stream, an ID of the first channel, and a download link of a media file in N media file sets included in the live stream of the first channel, and N is an integer greater than or equal to 1.

The channel change module 605 is specifically configured to: select, according to the playlist of the first channel, stream access points in the sub stream that are closest to a receiving moment of the channel change instruction; download, according to the download link that is in the playlist of the first channel and that is of the media file included in the N media file sets, an image frame that is not played in a current media file, and play the image frame, where the current media file is a media file that is in the sub stream and in which image frames that are in a one-to-one correspondence with the closest stream access points are located; and when playing of all image frames in the current media file is completed, switch to play a next media file that is in the main stream and that is of a media file in a one-to-one correspondence with the current media file.

The "downloading" herein may mean that a terminal downloads the image frame to a cache area of the terminal.

The "image frame that is not played in a current media file" herein may be a media file, or may be some GOPs in a media file, or may even be some image frames of a GOP in a media file.

In this implementation, the sub stream is provided for channel change, and channel change does not depend only on the main stream. It may be learned that, a media file in the main stream has only one stream access point for access, and decoding dependency of the main stream is relatively complex. The sub stream provided in this implementation provides another possibility for channel change, so that when channel change occurs, the stream access point that is in the sub stream and that is closest to the receiving moment of the channel change instruction may be selected according to the playlist of the first channel, for access. Therefore, a change delay is reduced, and a shorter change-caused time deviation is generated.

Based on the foregoing embodiment, further, in the video change apparatus provided in this embodiment of the present invention, the channel change module 605 is further configured to:

after the image frame that is not played in the current media file is downloaded, download, before playing of all the image frames in the current media file is completed, the next media file that is in the main stream and that is of the media file in a one-to-one correspondence with the current media file.

In this way, before playing of the sub stream is completed, the next media file that is in the main stream and that is of the media file in a one-to-one correspondence with the current media file starts to be downloaded. Once playing of the current media file is completed, the next media file in the main stream may be directly accessed and start to be played. Therefore, switching between the sub stream and the main stream is seamless, and a change delay is reduced.

Based on the foregoing embodiment, in the channel change module 605 in this embodiment of the present invention, that the main stream and the sub stream are obtained by separately encoding the live stream of the first channel in different coding manners specifically includes:

the main stream is generated by using a video coding standard to encode the live stream of the first channel; and the sub stream is generated by using the video coding standard to encode the live stream of the first channel and inserting an auxiliary frame into the live stream of the first channel.

Specifically, the auxiliary frame includes a change I frame that is independently decodable and a change P frame that is decoded depending on the change I frame, and that the sub stream is generated by inserting the auxiliary frame into the live stream of the first channel specifically includes:

sequentially inserting, according to preset density, the change I frame and the change P frame into each media file in the N media file sets included in the live stream of the first channel, where the change I frame and the change P frame are used to provide the sub stream with more stream access points than the main stream.

It should be noted that, the sequential inserting herein means inserting the change I frame and the change P frame at intervals, and in this insertion manner, the frames may be evenly inserted, or may not be evenly inserted, but be sequentially inserted according to another rule.

The video coding standard may include H.263, H.264, H.265, MPEG1, MPEG2, MPEG4, AVS, REAL8, REAL9, VC1, VP6, VP8, DIVX3, MJPEG, or the like.

To make a reader more clearly understand the "inserting an auxiliary frame into the live stream of the first channel, to generate the sub stream" in this embodiment of the present invention, a concept constantly mentioned above, that is, GOP (group of picture), is first explained herein. A GOP generally means a video sequence including multiple images, generally starts from an independently decodable I frame, and generally includes only one I frame. The following is a commonly used GOP:

I P B B P B B P B B P B B P B B

The foregoing GOP includes 16 frames in total. According to a common video specification: 30 frames per second, the GOP may be played for approximately 0.53 second. In the video sequence, a volume of the I frame is very large, and is usually several times or tens of times those of the P frame and the B frame. Therefore, sometimes, to reduce a bit rate of the video sequence, a length of the GOP is increased to as great as tens of frames or even 120 frames.

In the "inserting an auxiliary frame into the live stream of the first channel, to generate the sub stream" mentioned in the foregoing embodiment, multiple SAPs are inserted into one slice, which means, generally, multiple independently decodable quasi-I frames (referred to as change I frames in this embodiment of the present invention) are inserted into one GOP as SAPs. A main purpose is to reduce decoding dependency inside the GOP, so that a user may start playing at multiple locations inside the current GOP without waiting for a start I frame of a next GOP.

In conclusion, the auxiliary frame includes the change I frame that is independently decodable and the change P frame that is decoded depending on the change I frame, and the change I frame and the change P frame are sequentially inserted into the live stream according to the preset density, to generate the sub stream. In this way, these change I frames and change P frames may provide channel change with more stream access points than the main stream, so that the terminal may obtain and play a decoding-refreshed image frame in real time according to these change I frames and change P frames. Therefore, the channel change may have a shorter change delay, and result in a shorter changed-cause time deviation.

Figure 7:
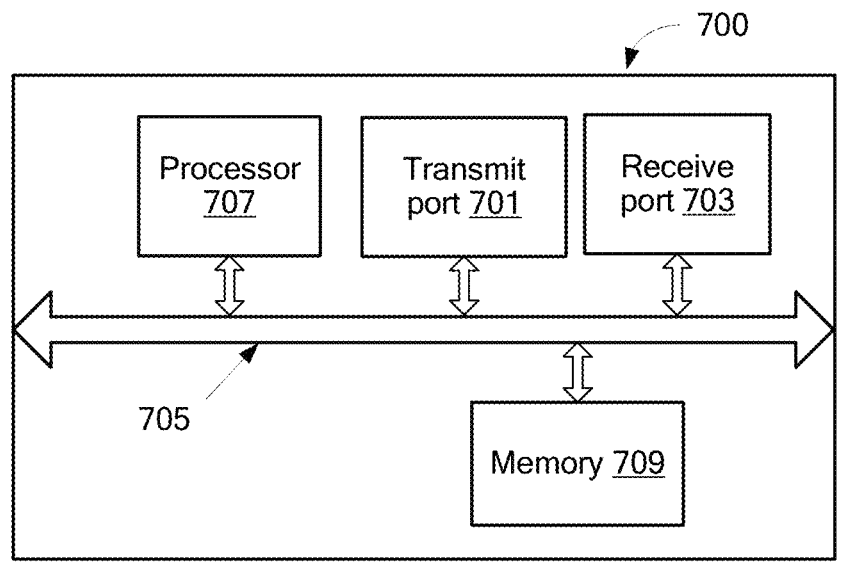
FIG. 7 is an embodiment of a server supporting channel change according to the present invention.

FIG. 7 shows an embodiment of a server supporting channel change provided in the present invention. A server 700 supporting channel change, applied to an OTT video service, may include:

a transmit port 701, a receive port 703, a bus 705, a processor 707, and a memory 709, where the bus 705 is configured to connect the transmit port 701, the receive port 703, the processor 707, and the memory 709, and the memory 709 is configured to store information.

The receive port 703 is configured to receive a live stream of a first channel. The live stream of the first channel includes N media file sets.

A first media file set includes n media files, N is an integer greater than or equal to 1, n is an integer greater than or equal to 2, and the first media file set is any one of the N media file sets.

The processor 707 is configured to separately encode the live stream of the first channel in different coding manners, to generate both a main stream and a sub stream. The main stream includes the N media file sets and main stream coding information, the sub stream includes the N media file sets and sub stream coding information, the main stream is used for live broadcast, and the sub stream is used for channel change.

The processor 707 is further configured to generate a playlist of the first channel according to channel information of the first channel, the coding information of the main stream, and the coding information of the sub stream. The playlist is used to: when a client sends a channel change instruction, instruct the client to perform channel change according to the main stream and the sub stream.

The transmit port 701 is configured to send the playlist of the first channel.

The channel information of the first channel may include a channel identifier such as a channel ID.

The server 700 supporting channel change that is provided in the foregoing embodiment separately encodes the live stream of the first channel in different coding manners, to generate the main stream and the sub stream, the main stream is used for live broadcast, and the sub stream is specially used for channel change. Therefore, when channel change occurs, the special sub stream is used to guide the channel change, so that channel change efficiency is improved.

It should be noted that, different functions performed by the processor 707 may be performed by processors in one server, or may be separately performed by different processors in different servers. For example, a server 1 (which may be referred to as a stream generation server) is configured to separately encode the live stream of the first channel in different coding manners, to generate both the main stream and the sub stream, and a server 2 (which may be referred to as a live server) is configured to generate the playlist of the first channel according to the channel information of the first channel, the coding information of the main stream, and the coding information of the sub stream. The playlist is used to: when the client sends the channel change instruction, instruct the client to perform channel change according to the main stream and the sub stream. To ensure that the method embodiment does not seem to be excessively scattered, no more details are described herein.

Based on the foregoing embodiment, the processor 707 in the channel change server 700 provided in this embodiment of the present invention is specifically configured to:

encode the live stream of the first channel by using a video coding standard, to generate the main stream; and encode the live stream of the first channel by using the video coding standard, and insert an auxiliary frame into the live stream of the first channel, to generate the sub stream.

Specifically, the auxiliary frame includes a change I frame that is independently decodable and a change P frame that is decoded depending on the change I frame. Further, the inserting an auxiliary frame into the live stream of the first channel, to generate the sub stream specifically includes:

sequentially inserting the change I frame and the change P frame into each media file in the N media file sets included in the live stream of the first channel, where the change I frame and the change P frame are used to provide the sub stream with more stream access points than the main stream.

It should be noted that, the sequential inserting herein means inserting the change I frame and the change P frame at intervals, and in this insertion manner, the frames may be evenly inserted, or may not be evenly inserted, but be sequentially inserted according to another rule.

The video coding standard may include H.263, H.264, H.265, MPEG1, MPEG2, MPEG4, AVS, REAL8, REAL9, VC1, VP6, VP8, DIVX3, MJPEG, or the like.

To make a reader more clearly understand the "inserting an auxiliary frame into the live stream of the first channel, to generate the sub stream" in this embodiment of the present invention, a concept, that is, GOP (group of picture), is first explained herein. A GOP generally means a video sequence including multiple images, generally starts from an independently decodable I frame, and generally includes only one I frame. The following is a commonly used GOP:

I P B B P B B P B B P B B P B B

The foregoing GOP includes 16 frames in total. According to a common video specification: 30 frames per second, the GOP may be played for approximately 0.53 second. In the video sequence, a volume of the I frame is very large, and is usually several times or tens of times those of the P frame and the B frame. Therefore, sometimes, to reduce a bit rate of the video sequence, a length of the GOP is increased to as great as tens of frames or even 120 frames.

In the "inserting an auxiliary frame into the live stream of the first channel, to generate the sub stream" mentioned in the foregoing embodiment, multiple SAPs are inserted into one slice, which means, generally, multiple independently decodable quasi-I frames (referred to as change I frames in this embodiment of the present invention) are inserted into one GOP as SAPs. A main purpose is to reduce decoding dependency inside the GOP, so that a user may start playing at multiple locations inside the current GOP without waiting for a start I frame of a next GOP.

In conclusion, the auxiliary frame includes the change I frame that is independently decodable and the change P frame that is decoded depending on the change I frame, and the change I frame and the change P frame are sequentially inserted into the live stream to generate the sub stream. In this way, these change I frames and change P frames may provide channel change with more stream access points than the main stream, so that a terminal may obtain and play a decoding-refreshed image frame in real time according to these change I frames and change P frames. Therefore, the channel change may have a shorter change delay, and result in a shorter changed-cause time deviation.

Based on the foregoing embodiment, in the server supporting channel change that is provided in this embodiment of the present invention, each of the n media files includes one or more GOPs (group of picture, group of pictures), and each GOP includes two or more image frames.

The processor is specifically configured to sequentially insert the change I frame and the change P frame according to preset density, where the preset density is specified according to a length of the GOP, and the length of the GOP is represented by a quantity of image frames included in the GOP.

Based on all the foregoing embodiments, optionally, the playlist of the first channel includes the coding information of the main stream, the coding information of the sub stream, an ID of the first channel, and a download link of a media file included in the N media file sets.

The coding information may include a coding standard and audio interleaving information, and may further include caption information.

Figure 8:
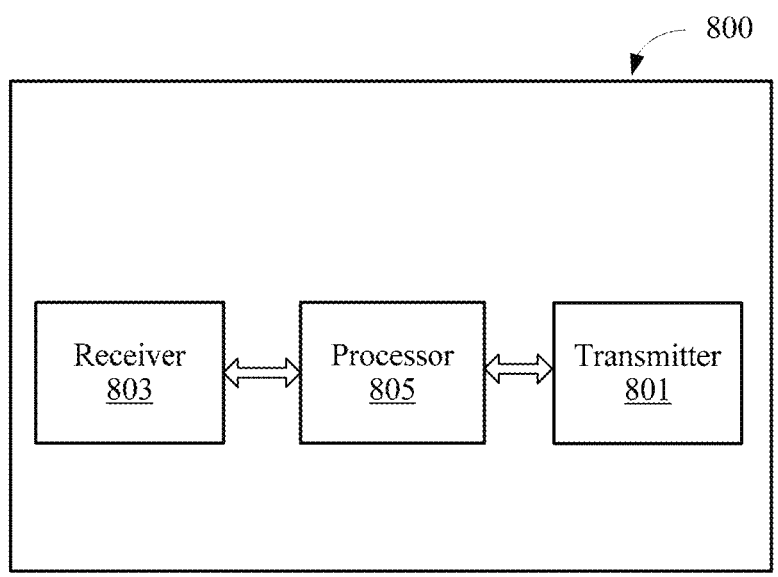
FIG. 8 is an embodiment of a terminal supporting channel change according to the present invention.

FIG. 8 shows an embodiment of a terminal supporting channel change provided in the present invention. A terminal 800 supporting channel change, applied to an OTT video service, may include a transmitter 801, a receiver 803, and a processor 805.

The transmitter 801 is configured to: send a channel change instruction, and stop obtaining a media file of a currently played channel.

The transmitter 801 is further configured to send a request to a server. The request is used to request a playlist of a first channel, and the first channel is a new channel that is a change target and that is indicated by the channel change instruction.

The receiver 803 is configured to receive the playlist of the first channel.

The processor 805 is configured to perform channel change according to the playlist of the first channel, a main stream, and a sub stream. The main stream and the sub stream are obtained by separately encoding a live stream of the first channel in different coding manners.

Channel information of the first channel may include a channel identifier such as a channel ID.

The terminal 800 supporting channel change that is provided in the foregoing embodiment receives the playlist of the first channel, and performs channel change according to the playlist of the first channel, the main stream, and the sub stream. The main stream and the sub stream are obtained by separately encoding the live stream of the first channel in different coding manners, the main stream is used for live broadcast, and the sub stream is specially used for channel change. Therefore, when channel change occurs, the special sub stream is used to guide the channel change, so that channel change efficiency is improved.

Based on the embodiment provided in FIG. 8, further, in this embodiment, the playlist of the first channel includes coding information of the main stream, coding information of the sub stream, an ID of the first channel, and a download link of a media file in N media file sets included in the live stream of the first channel, and N is an integer greater than or equal to 1.

The processor 805 is specifically configured to:

select, according to the playlist of the first channel, stream access points in the sub stream that are closest to a receiving moment of the channel change instruction; download, according to the download link that is in the playlist of the first channel and that is of the media file included in the N media file sets, an image frame that is not played in a current media file, and play the image frame, where the current media file is a media file that is in the sub stream and in which image frames that are in a one-to-one correspondence with the closest stream access points are located; and when playing of all image frames in the current media file is completed, switch to play a next media file that is in the main stream and that is of a media file in a one-to-one correspondence with the current media file.

The "downloading" herein may mean that the terminal 800 downloads the image frame to a cache area of the terminal 800.

The "image frame that is not played in a current media file" herein may be a media file, or may be some GOPs in a media file, or may even be some image frames of a GOP in a media file.

In this embodiment, the sub stream is provided for channel change, and channel change does not depend only on the main stream. It may be learned that, a media file in the main stream has only one stream access point for access, and decoding dependency of the main stream is relatively complex. The sub stream provided in this implementation provides another possibility for channel change, so that when channel change occurs, the stream access point that is in the sub stream and that is closest to the receiving moment of the channel change instruction may be selected according to the playlist of the first channel, for access. Therefore, a change delay is reduced, and a shorter change-caused time deviation is generated.

Based on the embodiment provided in FIG. 8, further, the processor 805 is further configured to:

after the image frame that is not played in the current media file is downloaded, download, before playing of all the image frames in the current media file is completed, the next media file that is in the main stream and that is of the media file in a one-to-one correspondence with the current media file.

In this way, before playing of the sub stream is completed, the next media file that is in the main stream and that is of the media file in a one-to-one correspondence with the current media file starts to be downloaded. Once playing of the current media file is completed, the next media file in the main stream may be directly accessed and start to be played. Therefore, switching between the sub stream and the main stream is seamless, and a change delay is reduced.

In the terminal 800 in the embodiment provided in FIG. 8, that the main stream and the sub stream are obtained by separately encoding the live stream of the first channel in different coding manners specifically includes:

the main stream is generated by using a video coding standard to encode the live stream of the first channel; and the sub stream is generated by using the video coding standard to encode the live stream of the first channel and inserting an auxiliary frame into the live stream of the first channel.

Specifically, the auxiliary frame includes a change I frame that is independently decodable and a change P frame that is decoded depending on the change I frame, and that the sub stream is generated by inserting the auxiliary frame into the live stream of the first channel specifically includes:

sequentially inserting, according to preset density, the change I frame and the change P frame into each media file in the N media file sets included in the live stream of the first channel, where the change I frame and the change P frame are used to provide the sub stream with more stream access points than the main stream.

It should be noted that, the sequential inserting herein means inserting the change I frame and the change P frame at intervals, and in this insertion manner, the frames may be evenly inserted, or may not be evenly inserted, but be sequentially inserted according to another rule.

The video coding standard may include H.263, H.264, H.265, MPEG1, MPEG2, MPEG4, AVS, REAL8, REAL9, VC1, VP6, VP8, DIVX3, MJPEG, or the like.

To make a reader more clearly understand the "inserting an auxiliary frame into the live stream of the first channel, to generate the sub stream" in this embodiment of the present invention, a concept constantly mentioned above, that is, GOP (group of picture), is first explained herein. A GOP generally means a video sequence including multiple images, generally starts from an independently decodable I frame, and generally includes only one I frame. The following is a commonly used GOP:

I P B B P B B P B B P B B P B B

The foregoing GOP includes 16 frames in total. According to a common video specification: 30 frames per second, the GOP may be played for approximately 0.53 second. In the video sequence, a volume of the I frame is very large, and is usually several times or tens of times those of the P frame and the B frame. Therefore, sometimes, to reduce a bit rate of the video sequence, a length of the GOP is increased to as great as tens of frames or even 120 frames.

In the "inserting an auxiliary frame into the live stream of the first channel, to generate the sub stream" mentioned in the foregoing embodiment, multiple SAPs are inserted into one slice, which means, generally, multiple independently decodable quasi-I frames (referred to as change I frames in this embodiment of the present invention) are inserted into one GOP as SAPs. A main purpose is to reduce decoding dependency inside the GOP, so that a user may start playing at multiple locations inside the current GOP without waiting for a start I frame of a next GOP.

In conclusion, the auxiliary frame includes the change I frame that is independently decodable and the change P frame that is decoded depending on the change I frame, and the change I frame and the change P frame are sequentially inserted into the live stream according to the preset density, to generate the sub stream. In this way, these change I frames and change P frames may provide channel change with more stream access points than the main stream, so that the terminal may obtain and play a decoding-refreshed image frame in real time according to these change I frames and change P frames. Therefore, the channel change may have a shorter change delay, and result in a shorter changed-caused time deviation.

A person of ordinary skill in the art may be aware that the units and algorithm steps in the examples described with reference to the embodiments disclosed in this specification may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the present invention.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in this application, it should be understood that the disclosed system, apparatus, and method may be implemented in other manners. For example, the described apparatus embodiments are merely examples. For example, the module division is merely logical function division and may be other division in actual implementation. For example, a plurality of modules or components may be combined or integrated into another system, or some features may be ignored or not performed. In addition, the displayed or discussed mutual couplings or direct couplings or communication connections may be indirect couplings or communication connections via some interfaces, apparatuses or units, and may be implemented in electronic, mechanical, or other forms.

The units described as separate parts may or may not be physically separate. Parts displayed as units may or may not be physical units, and may be located in one position, or may be distributed on a plurality of network units. Some or all of the modules may be selected according to actual requirements to achieve the objectives of the solutions of the embodiments.

In addition, functional modules in the embodiments of the present invention may be integrated into one processing unit, or each of the modules may exist alone physically, or two or more modules are integrated into one module.

When the functions are implemented in the form of a software function unit and sold or used as an independent product, the functions may be stored in a computer-readable storage medium. Based on such an understanding, the technical solutions of the present invention essentially, or the part contributing to the prior art, or some of the technical solutions may be implemented in a form of a software product. The software product is stored in a storage medium and includes several instructions for instructing a computer device (which may be a personal computer, a server, or a network device) or a processor to perform all or some of the steps of the methods described in the embodiments of the present invention. The foregoing storage medium includes: any medium that can store program code, such as a USB flash drive, a removable hard disk, a read-only memory (ROM, Read-Only Memory), a random access memory (RAM, Random Access Memory), a magnetic disk, or an optical disc.

The foregoing descriptions are merely specific embodiments of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A channel change method, applied to an Over The Top (OTT) video service, wherein the method comprises:
   receiving a live stream of a first channel, wherein the live stream of the first channel comprises N media the sets;
   separately encoding the live stream of the first channel in different coding manners, to generate both a main stream and a sub stream, wherein the main stream comprises the N media file sets and main stream coding information, the sub stream comprises the N media the sets and sub stream coding information, wherein the main stream is used for live broadcast, and the sub stream is used for channel change; and generating a playlist of the first channel according to channel information of the first channel, the main stream coding information, and the sub stream coding information, wherein the playlist, in response to a client sending a channel change instruction, instructs the client to perform channel change according to the main stream and the sub stream.

2. The method according to claim 1, wherein the separately encoding the live stream of the first channel in different coding manners, to generate both a main stream and a sub stream comprises:
encoding the live stream of the first channel using a video coding standard, to generate the main stream; and
encoding the live stream of the first channel using the video coding standard, and inserting an auxiliary frame into the live stream of the first channel, to generate the sub stream.

3. The method according to claim 2, wherein the auxiliary frame comprises a change I frame that is independently decodable and a change P frame that is decoded depending on the change I frame, and
the inserting an auxiliary frame into the live stream of the first channel, to generate the sub stream specifically comprises sequentially inserting the change I frame and the change P frame into each media file in the N media file sets comprised in the live stream of the first channel, wherein the change I frame and the change P frame are used to provide the sub stream with more stream access points than the main stream.

4. The method according to claim 3, wherein each of the n media files comprises one or more group of pictures (GOPs), and each GOP comprises two or more image frames; and
the sequentially inserting the change I frame and the change P frame specifically comprises: sequentially inserting the change I frame and the change P frame according to preset density, wherein the preset density is specified according to a length of the GOP, and the length of the GOP is represented by a quantity of image frames comprised in the GOP.

5. The method according to claim 1, wherein the playlist of the first channel comprises the main stream coding information, the sub stream coding information, an ID of the first channel, and a download link of a media file comprised in the N media file sets.

6. A channel change method, applied to an Over The Top (OTT) video service, wherein the method comprises:
sending a channel change instruction;
stopping obtaining a media file of a currently played channel;
requesting a playlist of a first channel from a server, wherein the first channel is a new channel that is a change target and that is indicated by the channel change instruction;
receiving the playlist of the first channel; and
performing channel change according to the playlist of the first channel, a main stream, and a sub stream, wherein the main stream and the sub stream are obtained by separately encoding a live stream of the first channel in different coding manners.

7. The method according to claim 6, wherein the playlist of the first channel comprises coding information of the main stream, coding information of the sub stream, an ID of the first channel, and a download link of a media file in N media file sets comprised in the live stream of the first channel, and N is an integer greater than or equal to 1.

8. The method according to claim 7, wherein the performing channel change according to the playlist of the first channel, a main stream, and a sub stream comprises:
selecting, according to the playlist of the first channel, stream access points in the sub stream that are closest to a receiving moment of the channel change instruction;
downloading, according to the download link that is in the playlist of the first channel and that is of the media file comprised in the N media file sets, an image frame that is not played in a current media file; and
playing the image frame, wherein the current media file is a media file that is in the sub stream and in which image frames that are in a one-to-one correspondence with the closest stream access points are located; and if playing of all image frames in the current media file is completed, switching to play a next media file that is in the main stream and that is of a media file in a one-to-one correspondence with the current media file.

9. The method according to claim 8, wherein the method further comprises:
after the downloading an image frame that is not played in a current media file, downloading, before playing of all the image frames in the current media file is completed, the next media file that is in the main stream and that is of the media file in a one-to-one correspondence with the current media file.

10. The method according to claim 6, wherein that the main stream and the sub stream are obtained by separately encoding the live stream of the first channel in different coding manners specifically comprises:
the main stream is generated using a video coding standard to encode the live stream of the first channel; and
the sub stream is generated using the video coding standard to encode the live stream of the first channel and inserting an auxiliary frame into the live stream of the first channel.

11. The method according to claim 10, wherein the auxiliary frame comprises a change I frame that is independently decodable and a change P frame that is decoded depending on the change I frame, and that the auxiliary frame is inserted into the live stream of the first channel specifically comprises:
sequentially inserting, according to preset density, the change I frame and the change P frame into each media file in N media file sets comprised in the live stream of the first channel, wherein the change I frame and the change P frame are used to provide the sub stream with more stream access points than the main stream.

12. A server supporting channel change, applied to an Over The Top (OTT) video service, wherein the server comprises a transmit port, a receive port, a bus, at least one processor, and a non-transitory computer-readable storage medium coupled to the at least one processor and storing programming instructions for execution by the at least one processor, the bus is configured to connect the transmit port, the receive port, the at least one processor, and the non-transitory computer-readable storage medium;
wherein the receive port is configured to receive a live stream of a first channel, wherein the live stream of the first channel comprises N media file sets;
wherein the programming instructions instruct the at least one processor to separately encode the live stream of the first channel in different coding manners, to generate both a main stream and a sub stream, wherein the main stream comprises the N media file sets and main stream coding information, the sub stream comprises the N media file sets and sub stream coding information, the main stream is used for live broadcast, and the sub stream is used for channel change;
wherein the programming instructions further instruct the at least one processor to generate a playlist of the first channel according to channel information of the first channel, the main stream coding information, and the sub stream coding information, wherein the playlist, in response to a client sending a channel change instruction, instructs the client to perform channel change according to the main stream and the sub stream; and wherein the transmit port is configured to send the playlist of the first channel.

13. The server according to claim 12, wherein the programming instructions instruct the at least one processor:
encode the live stream of the first channel by using a video coding standard, to generate the main stream; and
encode the live stream of the first channel by using the video coding standard, and insert an auxiliary frame into the live stream of the first channel, to generate the sub stream.

14. The server according to claim 13, wherein the auxiliary frame comprises a change I frame that is independently decodable and a change P frame that is decoded depending on the change I frame, and the programming instructions instruct the at least one processor to:
sequentially insert the change I frame and the change P frame into each media file in the N media file sets comprised in the live stream of the first channel, wherein the change I frame and the change P frame are used to provide the sub stream with more stream access points than the main stream.

15. The server according to claim 14, wherein each of the n media files comprises one or more GOPs, group of pictures, and each GOP comprises two or more image frames; and
wherein the programming instructions instruct the at least one processor to sequentially insert the change I frame and the change P frame according to preset density, wherein the preset density is specified according to a length of the GOP, and the length of the GOP is represented by a quantity of image frames comprised in the GOP.

16. The server according to claim 12, wherein the playlist of the first channel comprises the main stream coding information, the sub stream coding information, an ID of the first channel, and a download link of a media file comprised in the N media file sets.

17. A terminal supporting channel change, applied to an OTT video service, wherein the terminal comprises a transmitter, a receiver, at least one processor and a non-transitory computer-readable storage medium coupled to the at least one processor and storing programming instructions for execution by the at least one processor;
the transmitter is configured to: send a channel change instruction, and stop obtaining a media file of a currently played channel;
the transmitter is further configured to send a request to a server, wherein the request requests a playlist of a first channel, and the first channel is a new channel that is a change target and that is indicated by the channel change instruction;
the receiver is configured to receive the playlist of the first channel; and
the programming instructions instruct the at least one processor to perform channel change according to the playlist of the first channel, a main stream, and a sub stream, wherein the main stream and the sub stream are obtained by separately encoding a live stream of the first channel in different coding manners.

18. The terminal according to claim 17, wherein the playlist of the first channel comprises coding information of the main stream, coding information of the sub stream, an ID of the first channel, and a download link of a media file in N media file sets comprised in the live stream of the first channel, and N is an integer greater than or equal to 1.

19. The terminal according to claim 18, wherein the programming instructions instruct the at least one processor to:
select, according to the playlist of the first channel, stream access points in the sub stream that are closest to a receiving moment of the channel change instruction;
download, according to the download link that is in the playlist of the first channel and that is of the media file comprised in the N media file sets, an image frame that is not played in a current media file; and
play the image frame, wherein the current media file is a media file that is in the sub stream and in which image frames that are in a one-to-one correspondence with the closest stream access points are located; and
if playing of all image frames in the current media file is completed, switch to play a next media file that is in the main stream and that is of a media file in a one-to-one correspondence with the current media file.

20. The terminal according to claim 19, wherein the programming instructions instruct the at least one processor to:
after the image frame that is not played in the current media file is downloaded, download, before playing of all the image frames in the current media file is completed, the next media file that is in the main stream and that is of the media file in a one-to-one correspondence with the current media file.

21. The terminal according to claim 17, wherein that the main stream and the sub stream are obtained by separately encoding the live stream of the first channel in different coding manners specifically comprises:
wherein the main stream is generated using a video coding standard to encode the live stream of the first channel; and
wherein the sub stream is generated using the video coding standard to encode the live stream of the first channel and inserting an auxiliary frame into the live stream of the first channel.

22. The terminal according to claim 21, wherein the auxiliary frame comprises a change I frame that is independently decodable and a change P frame that is decoded depending on the change I frame, and that the auxiliary frame is inserted into the live stream of the first channel specifically comprises:
wherein the change I frame and the change P frame are sequentially inserting, according to preset density, into each media file in N media file sets comprised in the live stream of the first channel, wherein the change I frame and the change P frame are used to provide the sub stream with more stream access points than the main stream.

* * * * *